Jan. 2, 1923. 1,441,138.
B. WESTERVELT.
ADAPTER FOR ACETYLENE TANKS.
FILED AUG. 6, 1920.
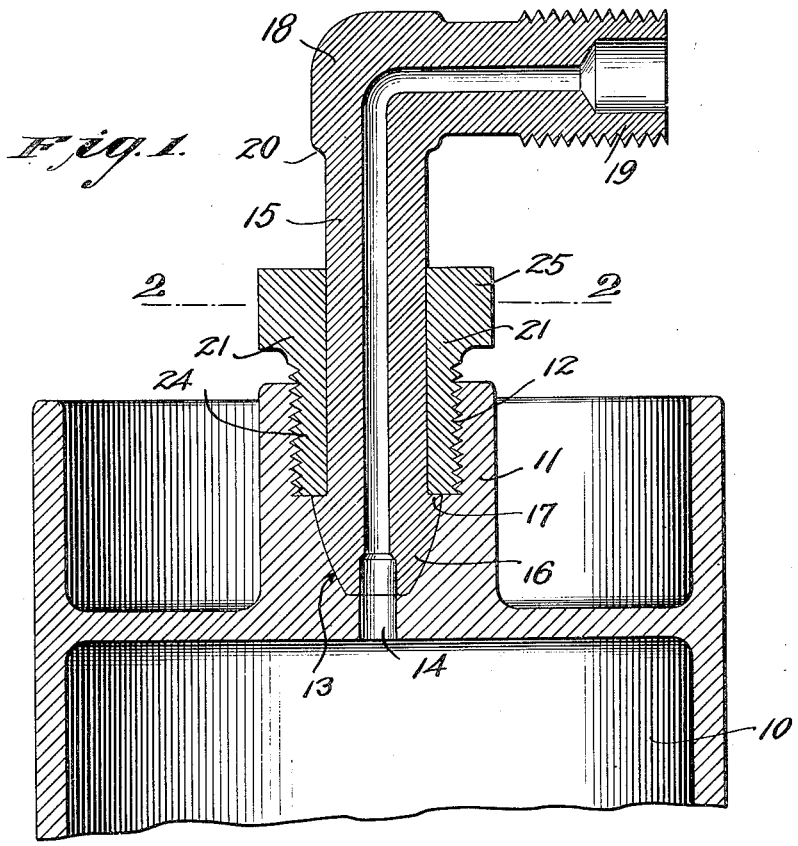
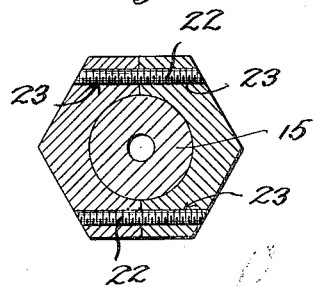
WITNESSES
H. C. Hebig
Hugh H. Ott
INVENTOR
BART WESTERVELT,
BY
ATTORNEYS Patented Jan. 2, 1923.

UNITED STATES PATENT OFFICE.

BART WESTERVELT, OF BROOKLYN, NEW YORK.

ADAPTER FOR ACETYLENE TANKS.

Application filed August 6, 1920. Serial No. 401,813.

*To all whom it may concern:*

Be it known that I, BART WESTERVELT, a citizen of the United States, and a resident of the city of New York, borough of Brooklyn, in the county of Kings and State of New York, have invented a new and Improved Adapter for Acetylene Tanks, of which the following is a full, clear, and exact description.

This invention relates to acetylene tanks and particularly to an adapter nozzle therefor.

In the form of adapter nozzles which are now in general use, the header tubular shank is threaded into an elbow after the retaining sleeve is applied and the point of connection between the shank and the elbow is soldered to prevent leakage. It has been observed that solder breaks at the point of connection, often resulting in leakage, explosions, and other serious consequences.

This invention seeks for its principal object to obviate these and other disadvantages by providing an improved form of adapter nozzle in which the elbow and headed shank are integrally constructed to eliminate the necessity of soldering the same together.

The invention further contemplates the provision of a longitudinally split retaining sleeve which when the sections thereof are associated and secured together on the shank, functions in the same manner as the form of retaining sleeve now employed on adapter nozzles now in use.

A further object and advantage of the invention is to provide a safety adapter nozzle which does not materially increase the expense of manufacture and production.

With the above recited and other objects in view, some of which will be more apparent hereafter, reference is had to the following detailed description, the appended claims and the accompanying drawings forming a part of this application, and in which;

Figure 1 is a fragmentary vertical sectional view through a portion of the tank with the improved adapter nozzle in applied position.

Figure 2 is a detail transverse sectional view through the adapter nozzle and the retaining sleeve.

Referring to the drawings by characters of reference, 10 designates an acetylene tank provided with the usual boss 11 having the interiorly threaded portion 12 communicating with a ground seat 13. An outlet bore 14 communicates respectively with the seat 13 and the interior of the tank 10. The adapter nozzle includes a tubular shank 15 having formed at one extremity a head 16 of a size and shape to snugly fit the seat 13, the juncture of the head with the shank forming an annular shoulder 17. The opposite extremity of the shank has integrally formed therewith an elbow 18, the free extremity of which constitutes a nipple 19 for connection with a hose or flexible pipe leading to the burner. The juncture of the elbow with the shank provides an annular shoulder 20 and a retaining sleeve comprising identically formed semi-cylindrical sections 21 is secured on the shank for sliding and rotary movement by means of the threaded stems 22 passed transversely through the threaded apertures 23 in the sleeve. A portion of each section of the retaining sleeve is provided with mating external threads 24 adapted to engage the internal threaded portion 12 of the boss for advancing and holding the head 16 in the seat 13. The sections of the retaining sleeve are further provided with enlarged angularly faced mating portions 25 which provide means with which a wrench may be associated to effect the threading or removal of the retaining sleeve from the threaded portion 12 of the boss. By this arrangement it will be seen that an adapter nozzle is provided which consists of a tubular shank, elbow, and nipple formed integrally to eliminate a threaded connection between the shank and elbow necessitating soldering at this point which is objectionable and dangerous. It will be further noted that a retaining sleeve is provided which comprises a pair of identically formed semi-cylindrical sections with securing means for permanently holding the same together when applied to the shank for the purpose of securing and retaining the head in engagement with the seat on the tank.

While there has been illustrated and described a single and preferred embodiment of the invention, it is understood that the right is reserved to embodiments other than those actually disclosed, to the full extent indicated by the general meaning of the terms in which the claims are expressed and by variations in the phrasing of the same.

Having thus described my invention, I claim as new and desire to secure by Letters Patent:—

1. An adapter for acetylene tanks, comprising a tubular shank, an integral head formed at one extremity, an enlarged elbow at its opposite extremity, said elbow and head having central bores extending therethrough and communicating with the bore of the tubular shank, and a retaining sleeve including a pair of semi-cylindrical mating sleeve sections and means for retaining said sections in mated relation on the shank to permit of rotary and sliding movement of the same thereon.

2. The combination with an acetylene tank having a boss provided with a seat communicating with the interior of the tank and an internally threaded bore communicating with the seat, of an adapter nozzle for association therewith comprising a tubular shank having a head at one extremity adapted to be received by the seat and an integral elbow at its opposite end provided with a nipple, a rotary and slidable externally threaded retaining sleeve on said shank, said retaining sleeve comprising a pair of mating semi-cylindrical sections, and means for retaining the same in mated relation on the shank, when the latter is uncoupled from the tank.

BART WESTERVELT.